US012336650B2

(12) United States Patent
Sullivan

(10) Patent No.: US 12,336,650 B2
(45) Date of Patent: *Jun. 24, 2025

(54) REMOVABLE PLANT HANGER

(71) Applicant: Patrick Sullivan, Fort McMurray AB (CA)

(72) Inventor: Patrick Sullivan, Fort McMurray AB (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/971,918

(22) Filed: Oct. 24, 2022

(65) Prior Publication Data

US 2023/0043671 A1 Feb. 9, 2023

Related U.S. Application Data

(63) Continuation of application No. 17/181,401, filed on Feb. 22, 2021, now Pat. No. 11,478,092, which is a continuation of application No. 16/052,107, filed on Aug. 1, 2018, now Pat. No. 10,932,595.

(51) Int. Cl.
*A47G 7/04* (2006.01)
*F16M 13/02* (2006.01)

(52) U.S. Cl.
CPC ........... *A47G 7/044* (2013.01); *F16M 13/022* (2013.01)

(58) Field of Classification Search
CPC ............. A47G 7/044; A47G 7/02; A01G 5/04
USPC ........................................................... 47/39
See application file for complete search history.

(56) References Cited

U.S. PATENT DOCUMENTS

| | | | | |
|---|---|---|---|---|
| 5,313,910 A * | 5/1994 | Wittman | ................ | A01K 39/01 248/303 |
| 5,320,319 A * | 6/1994 | Winger | ................ | A47G 7/044 248/312.1 |
| 5,368,267 A * | 11/1994 | Howard | ................ | A47G 7/044 248/274.1 |
| 5,955,080 A * | 9/1999 | Reilly | ................ | A61P 37/04 424/278.1 |
| 8,336,837 B2 * | 12/2012 | Gephart | ................ | F16B 2/12 248/229.12 |
| 8,955,808 B2 * | 2/2015 | Buschbach | ............ | F16M 13/02 248/214 |
| 9,814,305 B2 * | 11/2017 | Brus | ................ | A47G 7/044 |
| 9,958,112 B1 * | 5/2018 | Johnson | ................ | A47G 7/045 |

(Continued)

FOREIGN PATENT DOCUMENTS

| | | | | |
|---|---|---|---|---|
| DE | 102010026124 A1 * | 1/2012 | ............ | A47G 7/044 |
| EP | 1308113 A1 * | 5/2003 | ............ | A47G 7/044 |

(Continued)

*Primary Examiner* — Monica L Perry
(74) *Attorney, Agent, or Firm* — Frost Brown Todd LLP

(57) ABSTRACT

A removable plant holder system in a first embodiment having at least one first plant holder assembly having a coupling-frame, an extension arm-member having a proximate end, and a distal end; wherein the plant holder system includes the at least one first plant holder assembly. The at least one first plant holder assembly is defined by the coupling-frame and the extension arm-member integrally combined for use. As such the extension arm-member is defined by the proximate end attached to the coupling-frame, and the distal end is thus able to act in a capacity for hanging a plant therefrom; the coupling-frame configured for removable attachment with a railed deck.

14 Claims, 5 Drawing Sheets

(56) References Cited

U.S. PATENT DOCUMENTS

| | | | |
|---|---|---|---|
| 2003/0052073 A1* | 3/2003 | Dix | A47B 57/48 |
| | | | 211/90.02 |
| 2011/0303809 A1* | 12/2011 | Tincher | A47G 23/0225 |
| | | | 248/214 |
| 2013/0240697 A1* | 9/2013 | Rutigliano | A47G 7/044 |
| | | | 248/227.1 |
| 2016/0025263 A1* | 1/2016 | Gibbons | F16B 2/22 |
| | | | 248/220.22 |
| 2016/0353877 A1* | 12/2016 | Brus | A47G 7/044 |
| 2019/0150368 A1* | 5/2019 | Tori | A47G 7/045 |

FOREIGN PATENT DOCUMENTS

| | | | | |
|---|---|---|---|---|
| EP | 2266444 A1 | 12/2010 | | |
| WO | WO-2006095141 A1 * | 9/2006 | | A01G 9/02 |

\* cited by examiner

REMOVABLE PLANT HANGER

This application is a continuation of U.S. patent application Ser. No. 17/181,401 filed Feb. 22, 2021, which is a continuation of U.S. patent application Ser. No. 16/052,107 filed Aug. 1, 2018, now U.S. Pat. No. 10,932,595, the disclosures of which is incorporated herein by reference in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of hangers of existing art and more specifically relates to removable plant hangers as a removable plant holder system.

RELATED ART

Many individuals like to grow plants for human or animal consumption. Others may enjoy gardening and the growing of plants and flowers for esthetics. Flowers and plants when strategically placed can make a residential or commercial property look very inviting. The flowers may create a 'warm ambiance' as well as may smell fresh to visitors and residents. Often times the plants may be difficult to position if not in portable pots. Further, it may be desirable to hang the plants in various locations. A suitable solution is desired.

Foreign Pat. Application No. EP2266444 to Harald Elderenbosch et al., relates to a plant holder system. The described plant holder system includes a system for supporting a plant holder, said plant holder system comprising a base frame comprising a frame fixating part for fixating the base frame to an item, such as a wall or balcony rim, and a holder support part for supporting the plant holder, and at least one holder fixating device for fixating the plant holder supported by the holder support part, wherein the at least one holder fixating device comprises at least one coupling part for coupling the holder fixating device to the base frame, at least one engaging part for engaging the plant holder supported by the holder support part, at least one support member for supporting a further plant holder system with the at least one holder fixating device coupled to the base frame, at least one fixating member for fixating the at least one the holder fixating device when supporting the further plant holder, and wherein the at least one holder fixating device is configured to in use support the further plant holder system such that the further plant holder system is orderly stacked on the plant holder system.

SUMMARY OF THE INVENTION

In view of the foregoing disadvantages inherent in the known hanger(s) and supports art, the present disclosure provides a novel removable plant hanger. The general purpose of the present disclosure, which will be described subsequently in greater detail, is to provide an efficient and effective removable plant hanger.

A removable plant holder system in a first embodiment is disclosed herein comprising: at least one first plant holder assembly having a coupling-frame, an extension arm-member having a proximate end, and a distal end; wherein the plant holder system comprises the at least one first plant holder assembly. The at least one first plant holder assembly is defined by the coupling-frame and the extension arm-member integrally combined for use. As such the extension arm-member is defined by the proximate end attached to the coupling-frame, and the distal end is thus able to act in a capacity for hanging a plant therefrom; the coupling-frame configured for removable attachment with a railed deck.

A removable plant holder system in an alternate embodiment is also described herein comprising: at least one first plant holder assembly having a coupling-frame, a base-extension-arm-member having a receiver (negative volume slot), an extender-extension-arm-member having a proximate end, and a distal end; wherein the plant holder system comprises the at least one first plant holder assembly. In this embodiment the at least one first plant holder assembly is defined by the coupling-frame and the base-extension-arm-member combined with the extender-extension-arm-member via the receiver for use. The extender-extension-arm-member is defined by the proximate end attached to the base-extension-arm-member and to coupling-frame, and the distal end is able to act in a capacity for hanging a plant therefrom; the coupling-frame configured for removable attachment with a railed deck.

A further alternate embodiment may comprise an anchor member secured to the balcony rail, and the extension arm-member (hanger arm) comprises a separate piece which is secured to the anchor. This allows the user to change up 'the design' without removing the anchor.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a removable plant hanger system, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a hanging means for plants and more particularly to removable plant hanger system as used to improve the efficiency of hanging plants from various objects and in various positions on constructions such as porches and decks with rails.

Generally speaking in a preferred embodiment the removable plant holder system comprises: at least one first plant holder assembly having a coupling-frame, an extension arm-member having a proximate end, and a distal end; wherein the plant holder system comprises the at least one first plant holder assembly. The at least one first plant holder assembly is defined by the coupling-frame and the extension arm-member integrally combined for use; wherein the coupling-frame comprises a cross-member having a right-hooked-end and a left-hooked-end. The coupling-frame is removably mounted such that the right-hooked-end and the left-hooked-end each engage at least one vertical-rail on a railed deck. In the preferred embodiment the coupling-frame is located on a plane below the extension arm-member during an in-use condition. Relationally speaking, the coupling-frame is located perpendicular to the extension arm-member during the in-use condition and the extension arm-member extends upwardly at an angle greater than 30 degrees from the coupling-frame. To maintain relative stability the extension arm-member contours partially about a horizontal-rail of the railed deck, (the horizontal-rail is a top-rail). The distal end of the extension arm-member comprises at least one curl; wherein the plant is potted and comprises a hanging-means to hang from the at least one curl. As such, the at least one first plant holder assembly is pulled into frictional-engagement as a plant hangs, a mass of the plant pulling the coupling-frame tightly adjacent the railed deck. The extension arm-member is defined by the proximate end attached to the coupling-frame, and the distal end able to act in a capacity for hanging the plant in the pot therefrom; the coupling-frame configured for removable attachment with the railed deck.

Referring now more specifically to the drawings by numerals of reference, there is shown in FIGS. 1-4, various views of a removable plant hanger 100.

Figure 1:
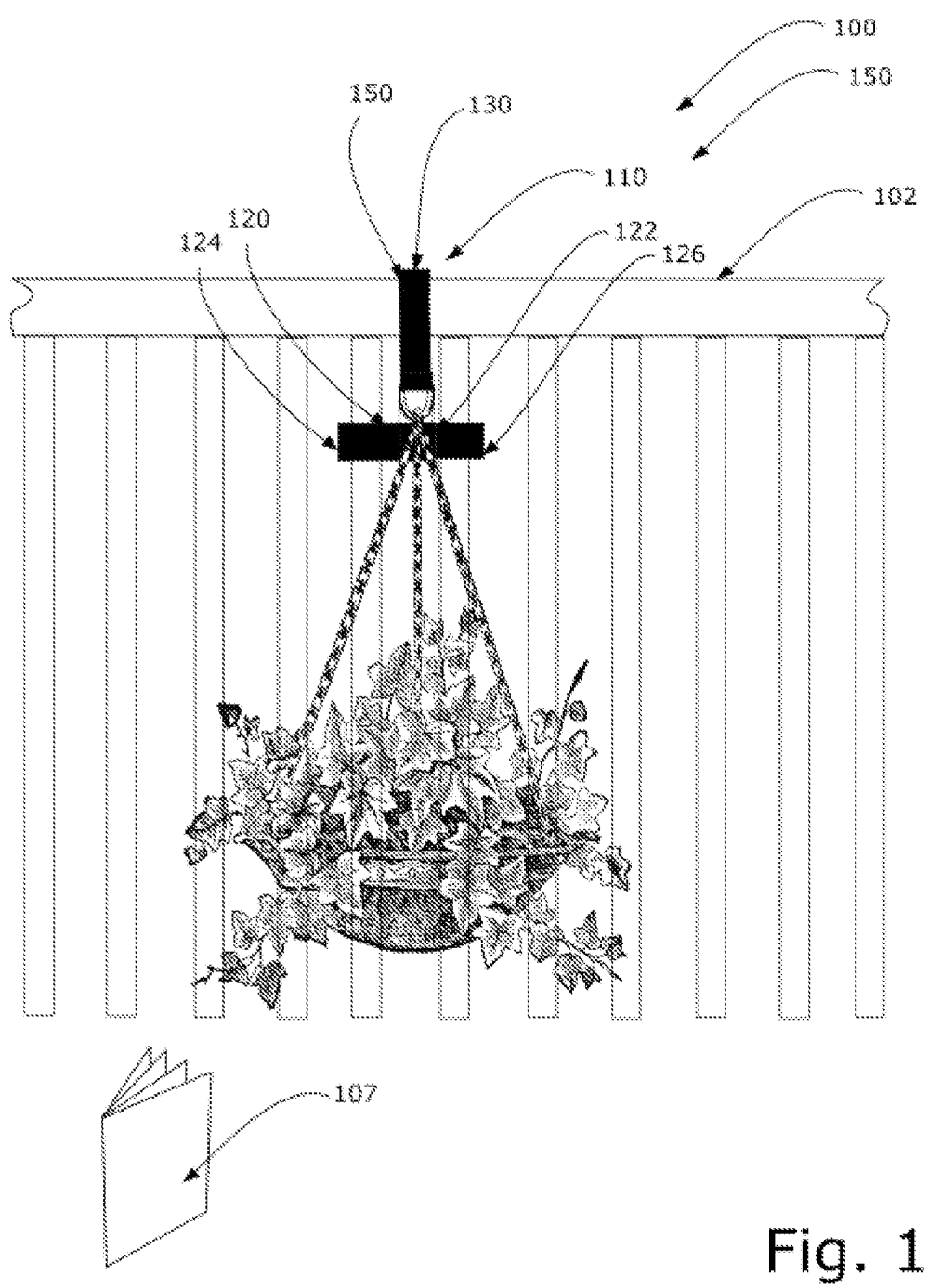
FIG. 1 is a perspective view of the removable plant hanger system during an 'in-use' condition, according to an embodiment of the disclosure.

FIG. 1 shows a removable plant hanger 100 during an 'in-use' condition 150, according to an embodiment of the present disclosure. Here, the removable plant hanger 100 may be beneficial for use by a user to hang potted plants from a railed deck 102 or the like. As illustrated, the removable plant hanger 100 in a first embodiment may include at least one first plant holder assembly 110 having a coupling-frame 120, an extension arm-member 130 (having a proximate end 132, and a distal end 134); wherein the plant holder system 100, as such, comprises the at least one first plant holder assembly 110. The at least one first plant holder assembly 110 in this particular embodiment is defined by the coupling-frame 120 and the extension arm-member 130 integrally combined for use. As such the extension arm-member 130 is defined by the proximate end 132 attached to the coupling-frame 120, and the distal end 134 is thus able to act in a capacity for hanging a (potted) plant therefrom; the coupling-frame 120 configured for removable attachment with a railed deck 102.

According to one embodiment, the removable plant hanger 100 may be arranged as a kit 105. In particular, the removable plant hanger 100 may further include a set of instructions 107. The instructions 107 may detail functional relationships in relation to the structure of the removable plant hanger 100 such that the removable plant hanger 100 can be used, maintained, or the like, in a preferred manner.

Figure 2:
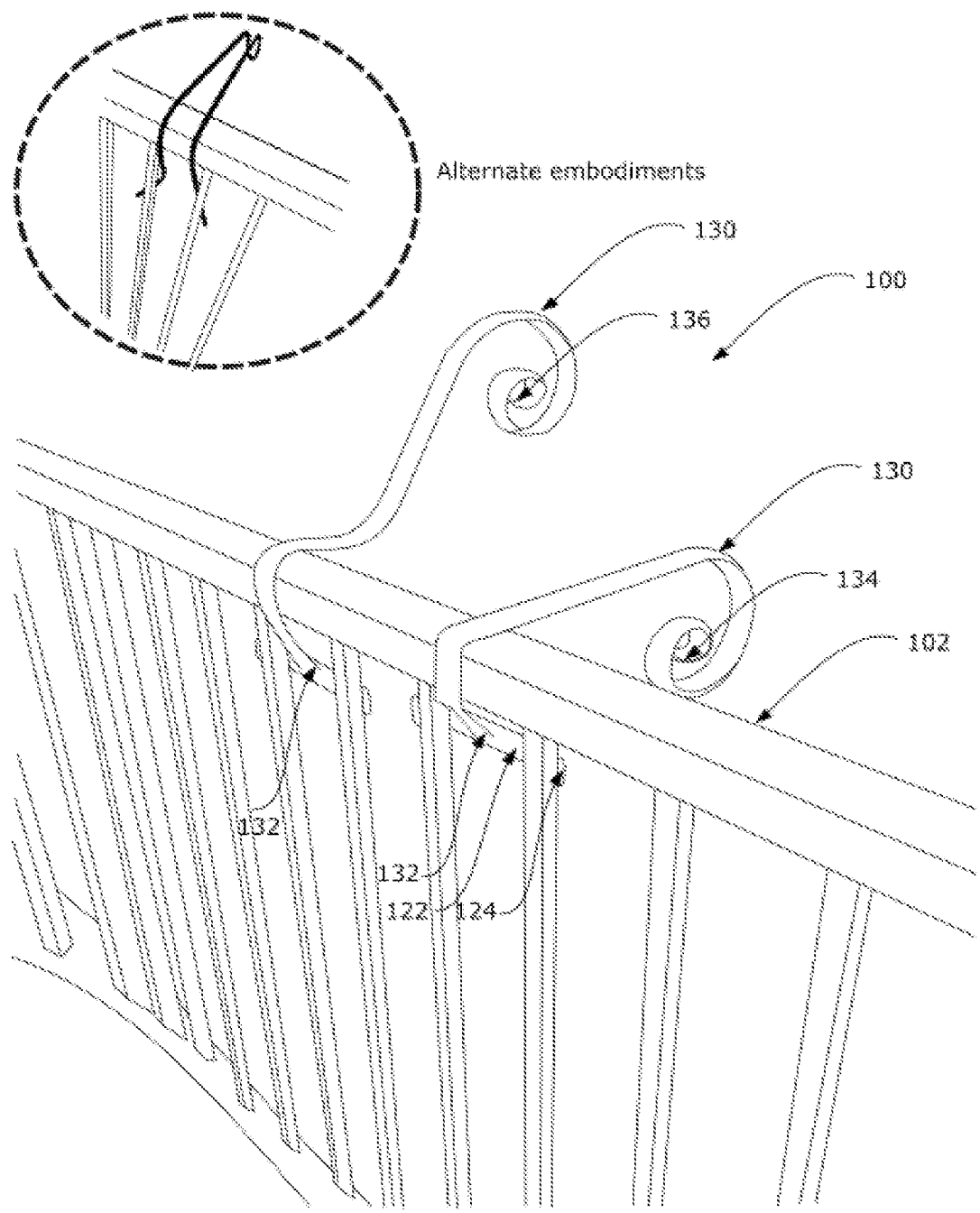
FIG. 2 is a perspective view of the removable plant hanger of FIG. 1, according to an embodiment of the present disclosure.
Figure 3:
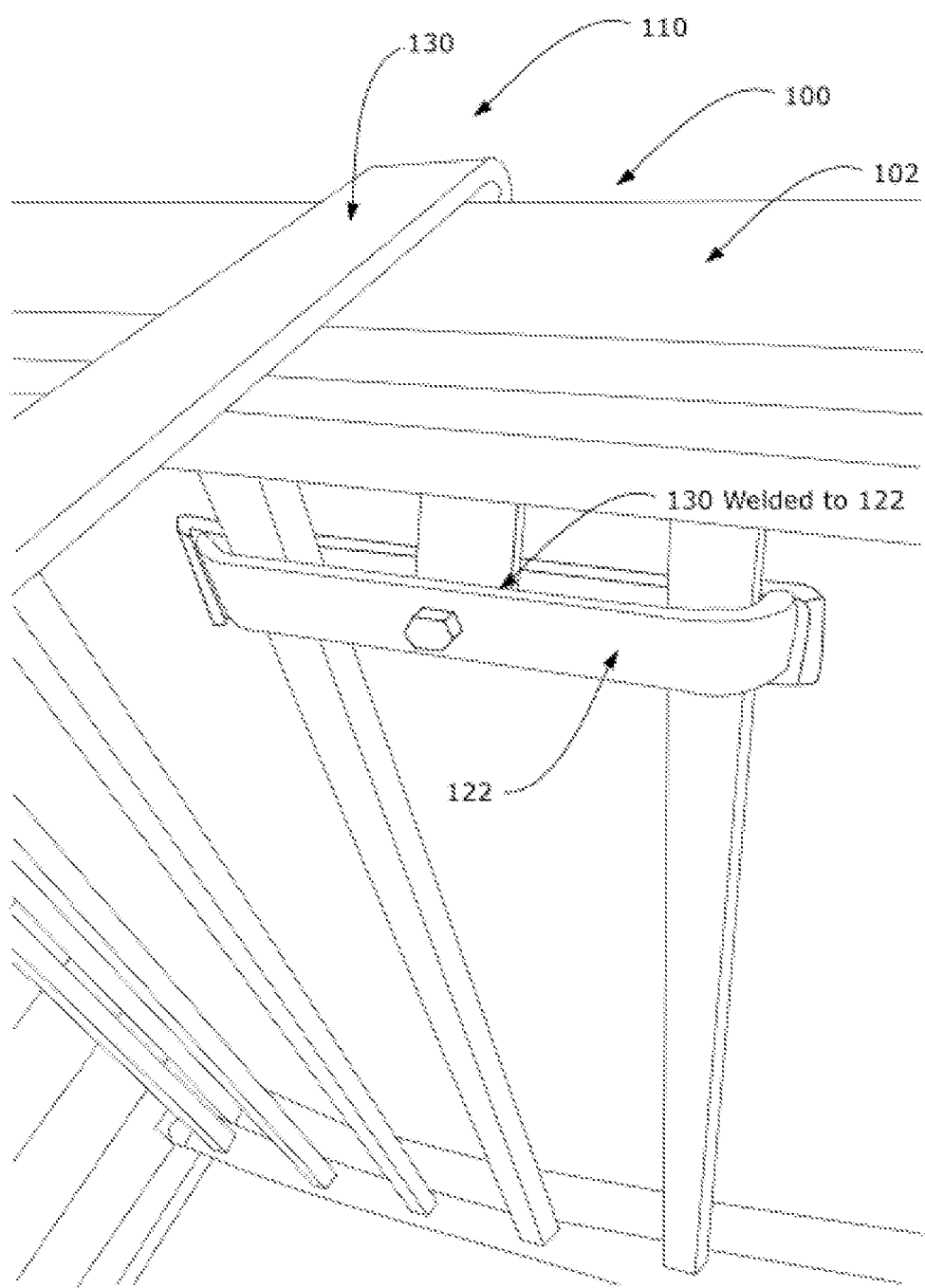
FIG. 3 is a perspective view of the removable plant hanger of FIG. 1, according to an embodiment of the present disclosure.
Figure 4:
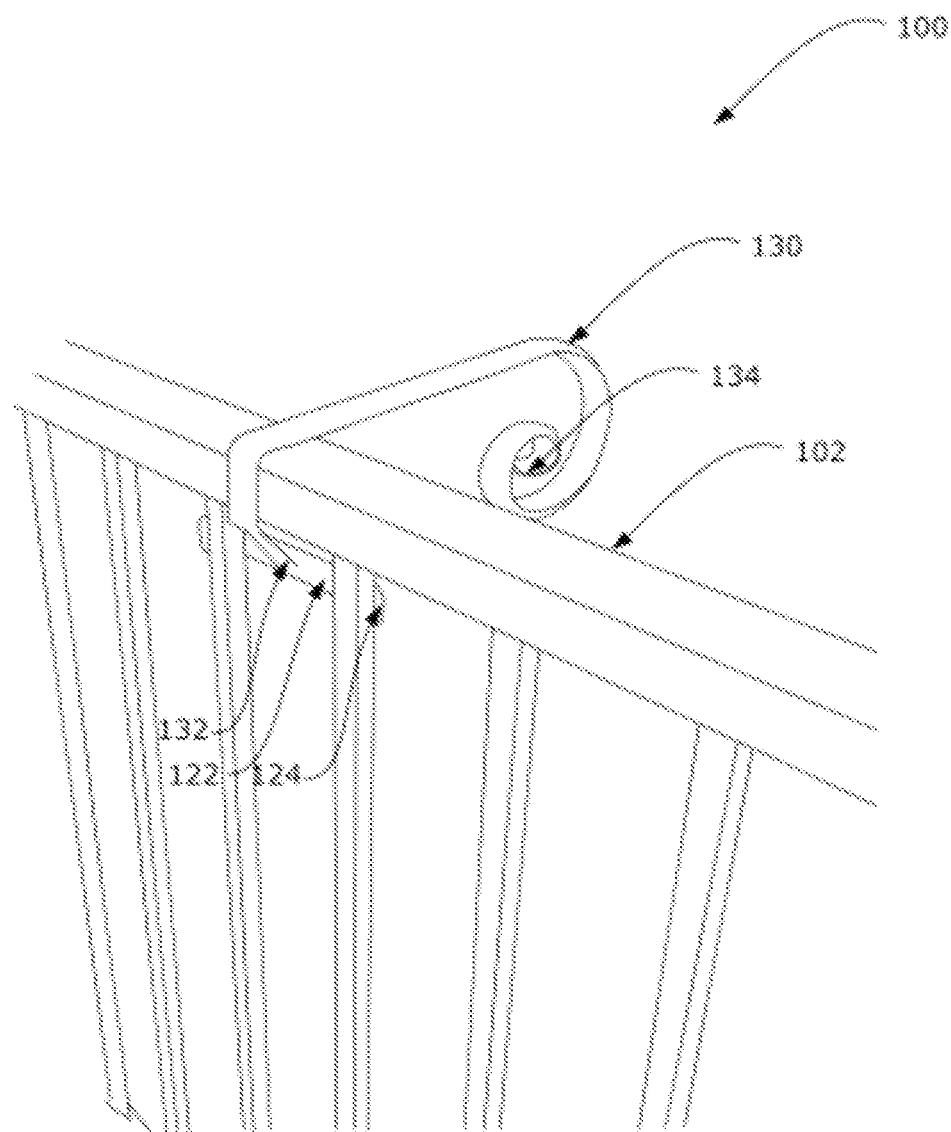
FIG. 4 is a perspective view of the removable plant hangers of FIG. 1, according to an embodiment of the present disclosure.

Referring now to FIGS. 2-4 showing various views of the removable plant hanger 100 of FIG. 1, according to an embodiment of the present disclosure. As above, the removable plant holder system 100 may include the coupling-frame 120 comprising a cross-member 122 having a right-hooked-end 124 and a left-hooked-end 126; wherein the coupling-frame 120 is removably mounted such that the right-hooked-end 124 and the left-hooked-end 126 each engage at least one vertical-rail on the railed deck, as shown. The coupling-frame 120 is located on a plane below the extension arm-member 130 during an in-use condition 150, as shown in FIG. 1. Generally, the coupling-frame 120 is located (substantially) perpendicular to the extension arm-member 130 during the in-use condition 150. The plant referred to herein is preferably potted and comprises a hanging-means (chain, rope or the like as shown in FIG. 1) to hang from the at least one curl 136. Certain alternate embodiments are shown in FIGS. 2 and 3. Alternate embodiments may be of a singular bent rod-member; one that allows an elevated positioning of the plant pot when hung and a version comprising an anchor is shown in FIG. 3.

Referring now to the extension arm-member 130; the extension arm-member 130 preferably extends upwardly at an angle greater than 30 degrees from the coupling-frame 120. Other angles are envisioned, as appropriate to the particular railed deck 102. The extension arm-member 130 contours partially about a horizontal-rail of the railed deck 102; wherein the horizontal-rail is a top-rail. The distal end 134 of the extension arm-member 130 comprises at least one curl 136. Certain embodiments may comprise multiple curls 136. The extension arm-member 130 extends parallel and perpendicular to the top-rail in certain embodiments and in other embodiments the extension arm-member 130 does not extend parallel to the top-rail, as shown in FIG. 2.

The at least one first plant holder assembly 110 is pulled into frictional-engagement as the plant hangs; a mass (weight and gravity) of the plant pulling the coupling-frame 120 tightly adjacent the railed deck 102. The at least one first plant holder assembly 110 may be a welded-assembly or formed of a one-piece manufacture such as those made in a molding process. The at least one first plant holder assembly 110 preferably comprises ferrous material or may comprise non-ferrous or other materials such as composites, plastics or the like. The removable plant holder system 100 may further comprise set of instructions, wherein the removable plant holder system is arranged as a kit as shown in FIGS. 1-2. Alternate embodiments may be included in the kit.

Figure 5:
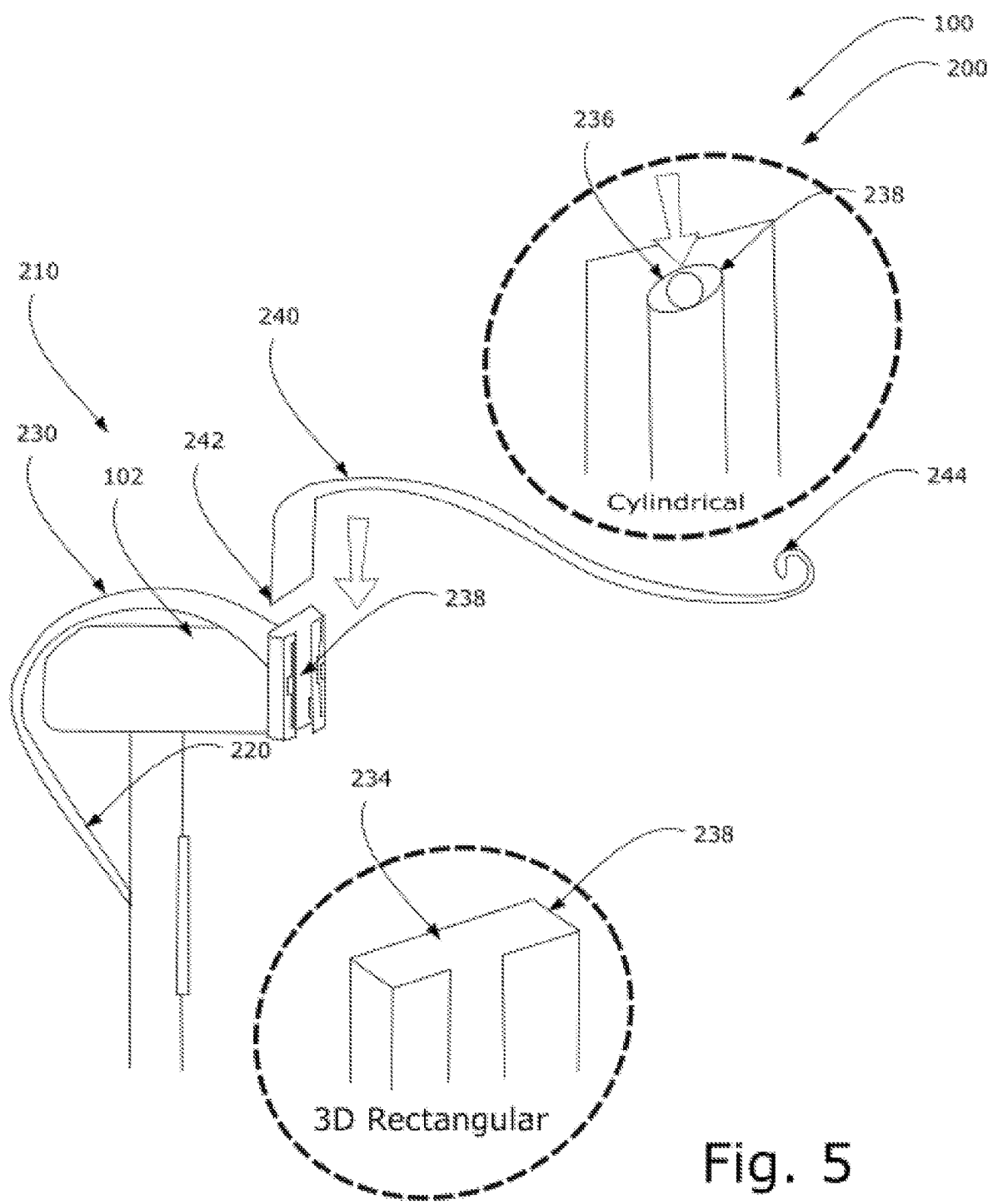
FIG. 5 is a perspective view of an alternate embodiment of the removable plant hanger, according to an embodiment of the present disclosure.

FIG. 5 shows a perspective view of an alternate embodiment of the removable plant hanger 200, according to an embodiment of the present disclosure. In this alternate embodiment of the removable plant holder system 100 the removable plant holder system 100 comprises: at least one first plant holder assembly 210 of the removable plant hanger 200 having a coupling-frame 220, a base-extension-arm-member 230 having a receiver 238, and an extenderextension-arm-member 240 having a proximate end 242, and a distal end 244; wherein the plant holder system 100 in this embodiment comprises the at least one first plant holder assembly 210. The at least one first plant holder assembly 210 is defined by the coupling-frame 220 and the base-extension-arm-member 230 combined with the extender-extension-arm-member 240 via the receiver 238 for use. As disclosed and shown the extender-extension-arm-member 240 is defined by the proximate end 242 attached to the base-extension-arm-member 230 and to coupling-frame 220, and the distal end 244 able to act in a capacity for hanging a plant therefrom. The coupling-frame 220 is configured for removable attachment with a railed deck 102. In this embodiment the receiver 238 has an outer profile selected from the group of consisting of a 3D-rectangular-profile 234 and a cylindrical-profile 236.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A removable plant holder system comprising:
   at least one first plant holder assembly having:
      a coupling-frame comprising a cross-member having a right-hooked-end and a left-hooked-end; and
      an extension arm-member having:
         a proximate end removably attached to said coupling-frame; and
         a distal end; wherein
      the coupling-frame is configured for removable attachment with a railed deck; and
      the distal end of the extension arm-member is configured for hanging a plant thereon.

2. The removable plant holder system of claim 1 wherein said coupling-frame is removably mounted such that said right-hooked-end and said left-hooked-end each engages at least one vertical-rail on said railed deck.

3. The removable plant holder system of claim 1 wherein said coupling-frame is located on a plane below said extension arm-member during an in-use condition.

4. The removable plant holder system of claim 3 wherein said coupling-frame is located perpendicular to said extension arm-member during said in-use condition.

5. The removable plant holder system of claim 1 wherein the extension arm-member extends upwardly at an angle greater than 30 degrees from said coupling-frame.

6. The removable plant holder system of claim 5 wherein the extension arm-member contours partially about a horizontal-rail of said railed deck.

7. The removable plant holder system of claim 6 wherein the horizontal-rail is a top-rail.

8. The removable plant holder system of claim 7 wherein the extension arm-member extends parallel and perpendicular to said top-rail.

9. The removable plant holder system of claim 7 wherein the extension arm-member does not extend parallel to said top-rail.

10. The removable plant holder system of claim 1 wherein the distal end of the extension arm-member comprises at least one curl.

11. The removable plant holder system of claim 10 wherein the plant is potted and comprises a hanging-means to hang from the at least one curl.

12. The removable plant holder system of claim 1 wherein the at least one first plant holder assembly is configured to be pulled into frictional-engagement as said plant hangs, a mass of said plant pulling said coupling-frame tightly adjacent said railed deck.

13. The removable plant holder system of claim 1 wherein the at least one first plant holder assembly comprises a welded-assembly.

14. The removable plant holder system of claim 1 wherein the at least one first plant holder assembly comprises ferrous material.

* * * * *